United States Patent [19]

Rubsam et al.

[11] Patent Number: 5,159,677
[45] Date of Patent: Oct. 27, 1992

[54] METHOD AND SYSTEM FOR STORING DATA IN AND RETRIEVING DATA FROM A NON-MAIN STORAGE VIRTUAL DATA SPACE

[75] Inventors: Kenneth G. Rubsam, Poughkeepsie; Richard J. Schmalz; Eugene S. Schulze, both of Wappingers Falls, all of N.Y.

[73] Assignee: International Business Machines Corp., Armonk, N.Y.

[21] Appl. No.: 274,239

[22] Filed: Nov. 21, 1988

[51] Int. Cl.⁵ .......................................... G06F 12/08
[52] U.S. Cl. ............................. 395/425; 364/DIG. 1
[58] Field of Search ... 364/200 MS File, 900 MS File

[56] References Cited

U.S. PATENT DOCUMENTS

| | | | |
|---|---|---|---|
| 3,909,798 | 9/1975 | Wallach et al. | 340/172.5 |
| 4,008,460 | 2/1977 | Bryant et al. | 364/200 |
| 4,264,953 | 4/1981 | Douglas et al. | 364/200 |
| 4,355,355 | 10/1982 | Butwell et al. | 364/200 |
| 4,356,549 | 10/1982 | Chueh | 364/200 |
| 4,463,424 | 7/1984 | Mattson et al. | 364/200 |
| 4,464,712 | 8/1984 | Fletcher | 364/200 |
| 4,476,524 | 10/1984 | Brown et al. | 364/200 |
| 4,521,846 | 6/1985 | Scalzi et al. | 364/200 |
| 4,603,380 | 7/1986 | Easton et al. | 364/200 |
| 4,636,946 | 1/1987 | Hartung et al. | 364/200 |
| 4,660,130 | 4/1987 | Bartley et al. | 364/200 |
| 4,835,734 | 5/1989 | Kodaira et al. | 364/900 |
| 4,926,317 | 5/1990 | Wallach et al. | 364/200 |
| 4,991,082 | 2/1991 | Yoshizawa et al. | 364/200 |

FOREIGN PATENT DOCUMENTS 0214870 9/1986 Japan.
0315945 11/1988 Japan.

OTHER PUBLICATIONS

"The IBM 3090 System: An Overview" by S. G. Tucker, IBM Systems Journal, vol. 25, No. 1, 1986, pp. 4–19.
MVS/Extended Architecture System Programming Library: System Macros & Facilities, vol. 1, GC28-1150 (Jun. 1987).
MVS/Extended Architecture Overview GC28-1348 (Mar. 1984).
IBM Enterprise Systems Architecture/370 Principles of Operation SA22-7200 (Aug. 1988).

*Primary Examiner*—Stuart S. Levy
*Assistant Examiner*—Reba I. Elmore
*Attorney, Agent, or Firm*—William B. Porter

[57] ABSTRACT

A non-main storage data space (NMDS) is presented, whose virtual pages may be backed by expanded storage, by a combination of expanded and auxiliary storage, but not by main storage. Mechanisms are provided to prevent direct referencing of data in a NMDS by instructions, and to bring data into and out of NMDS's. The I/O mechanisms minimize physical I/O by exchanging pointers to backing pages in appropriate cases. Additionally, control is returned immediately to I/O-initiating applications, when I/O is required between an address space and a NMDS, without the need for synchronization by the application: the mechanism provides for synchronization by the system's page fault processing.

10 Claims, 11 Drawing Sheets

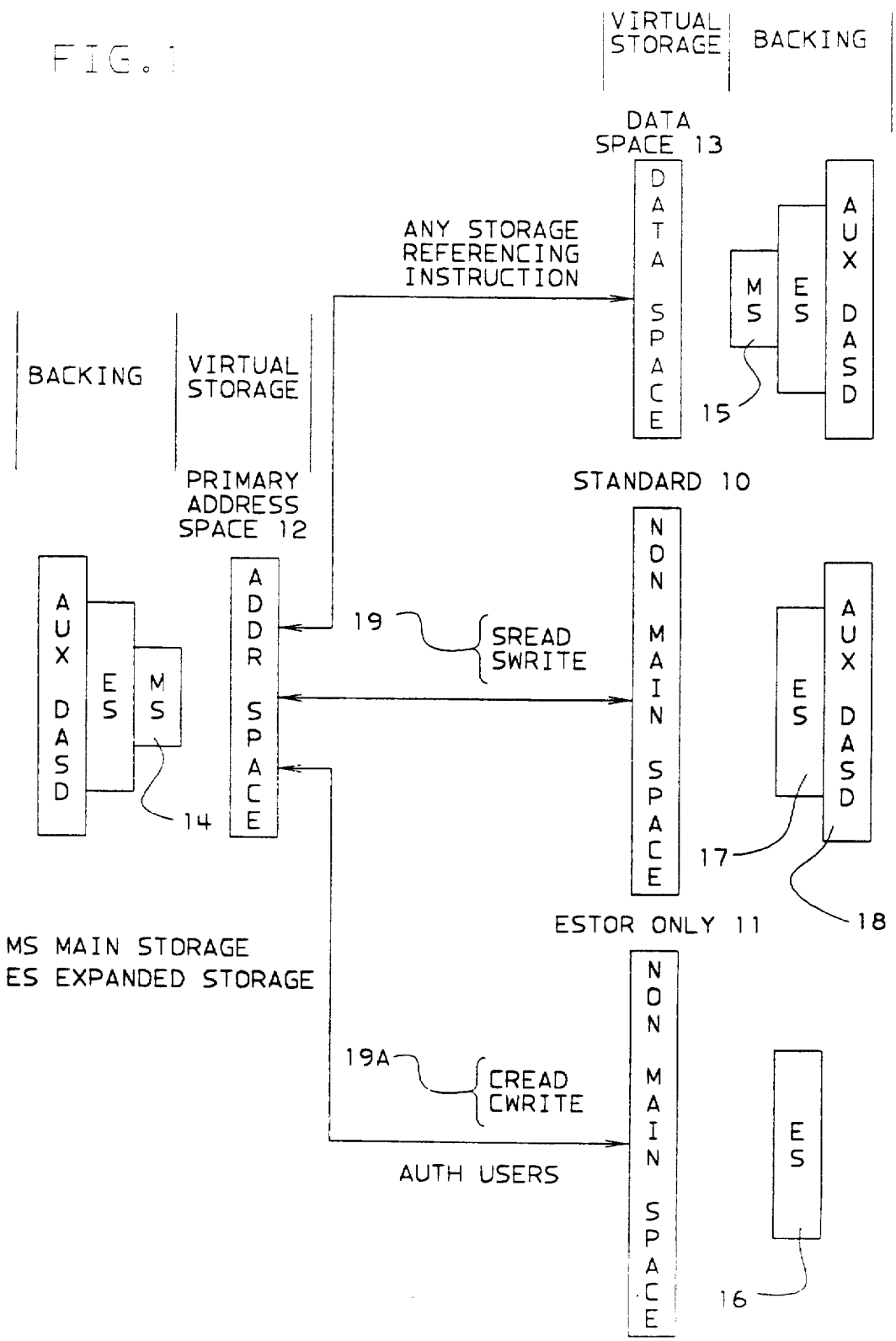

MVS/XA

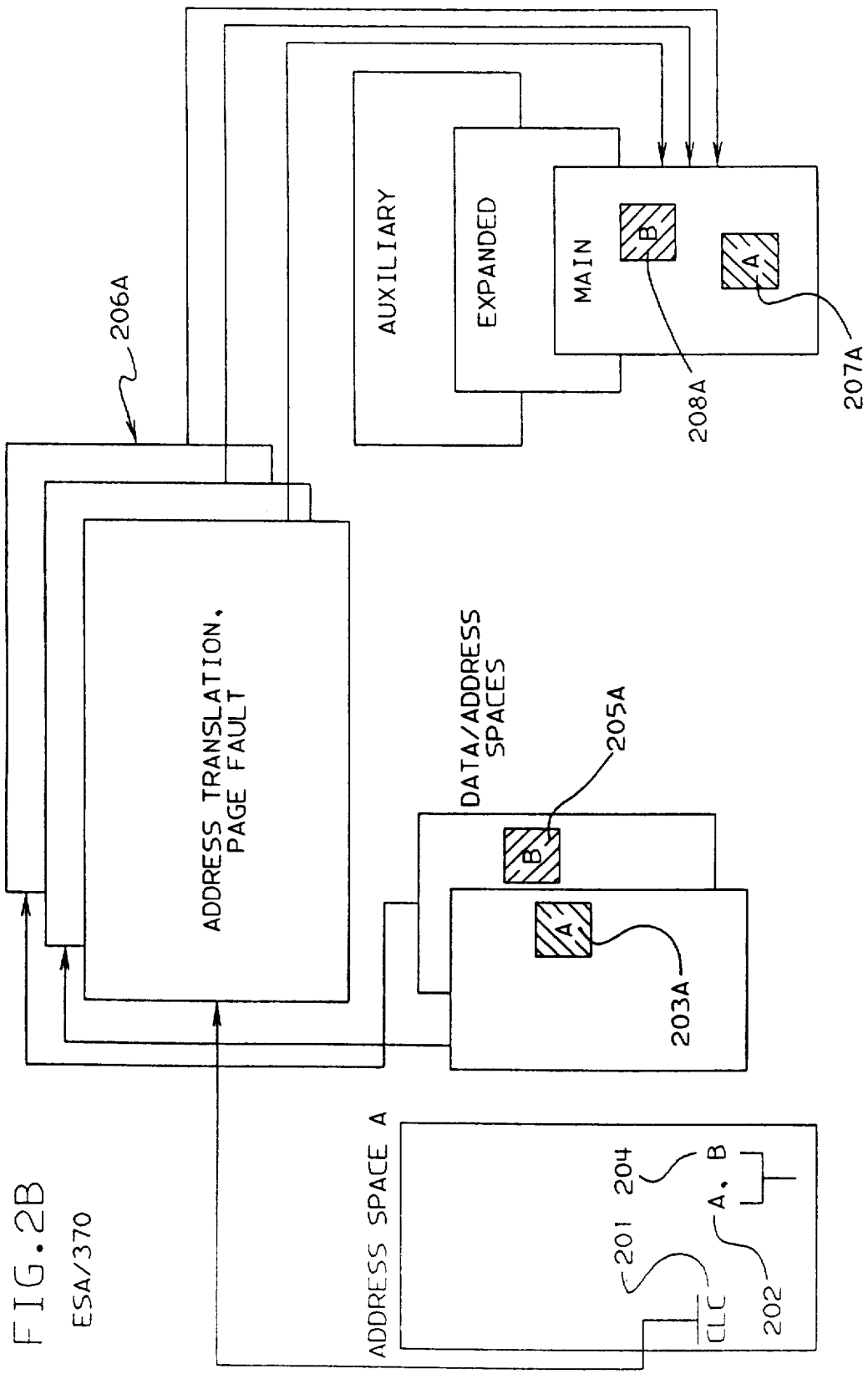
FIG.2B ESA/370

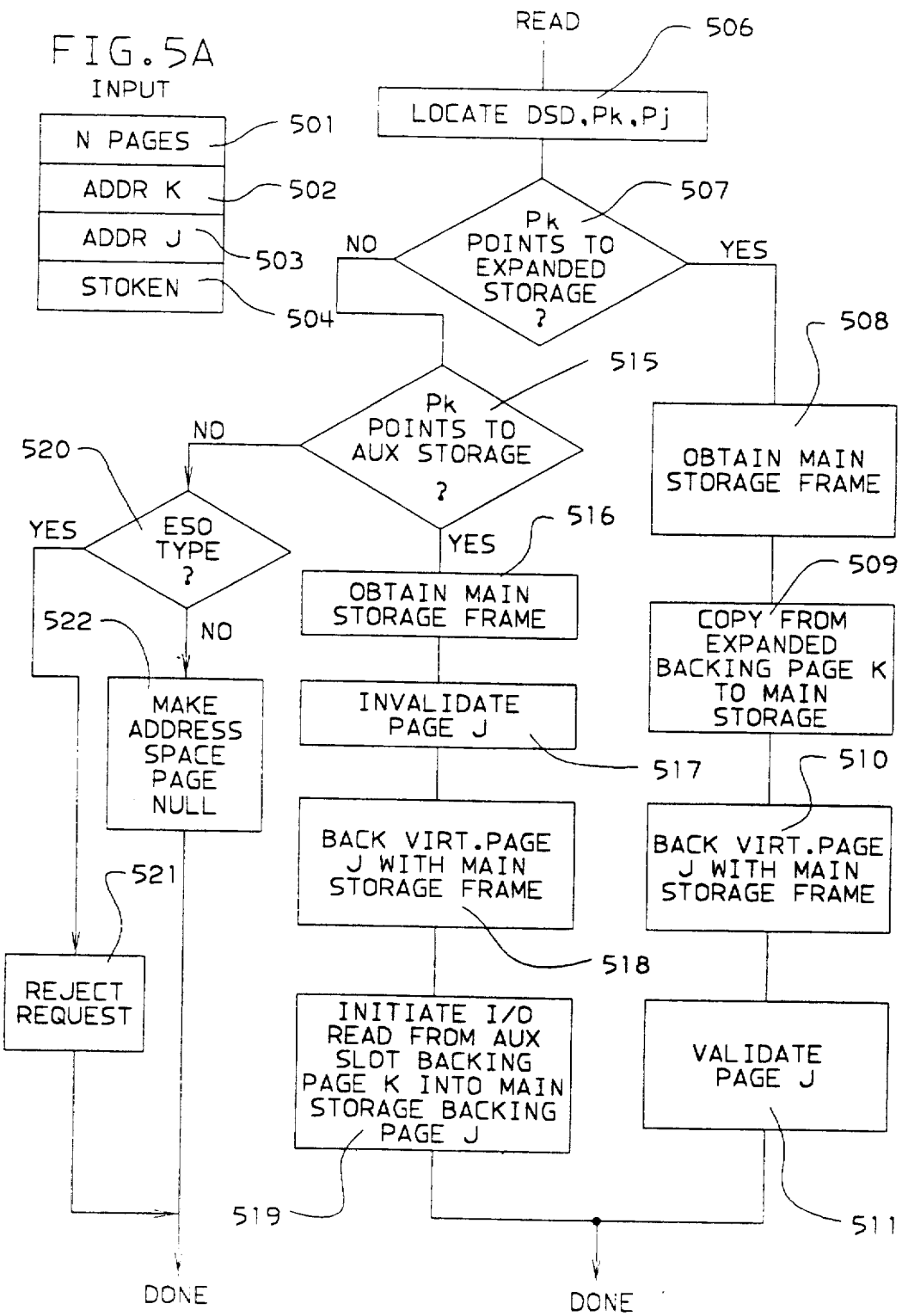

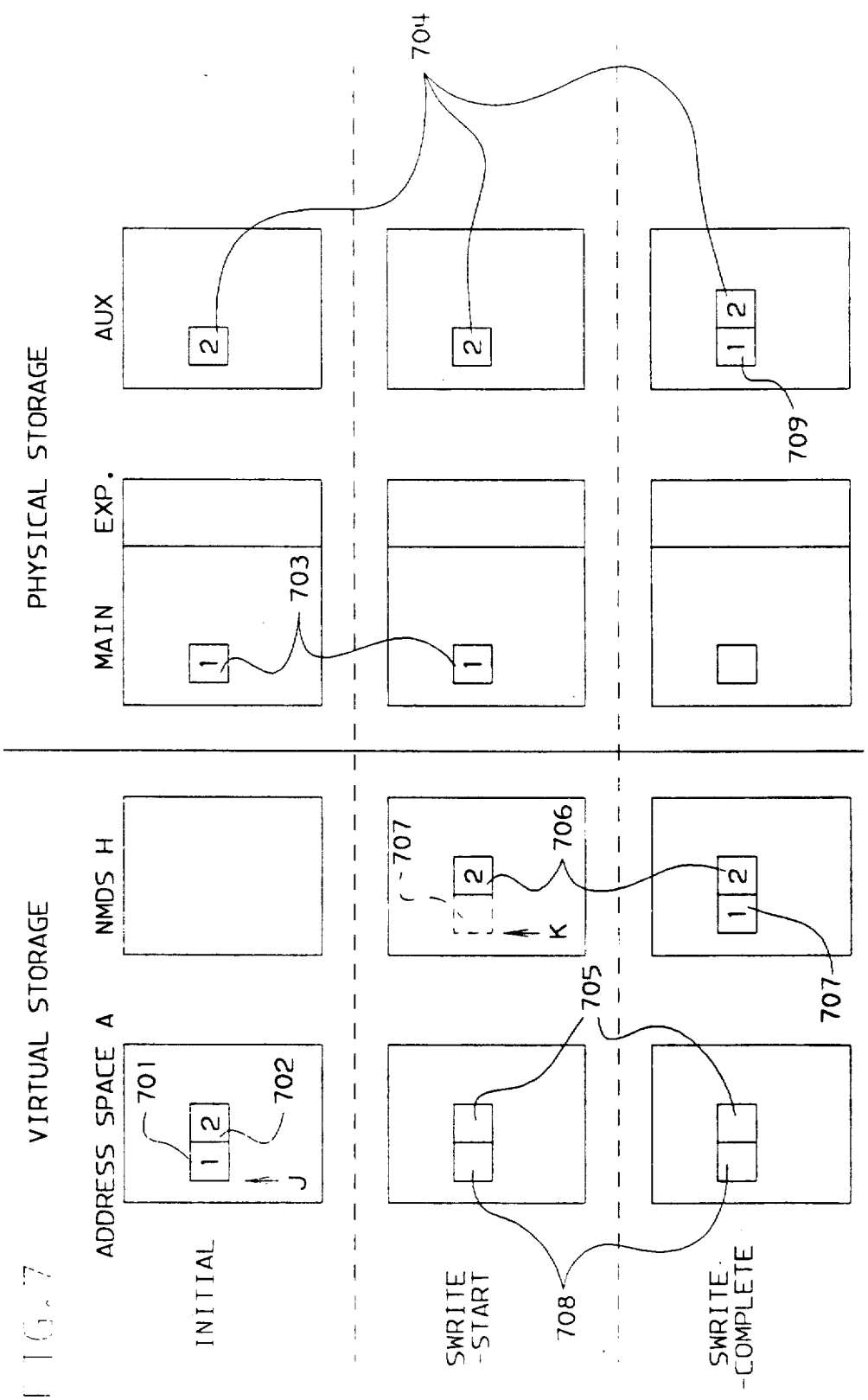

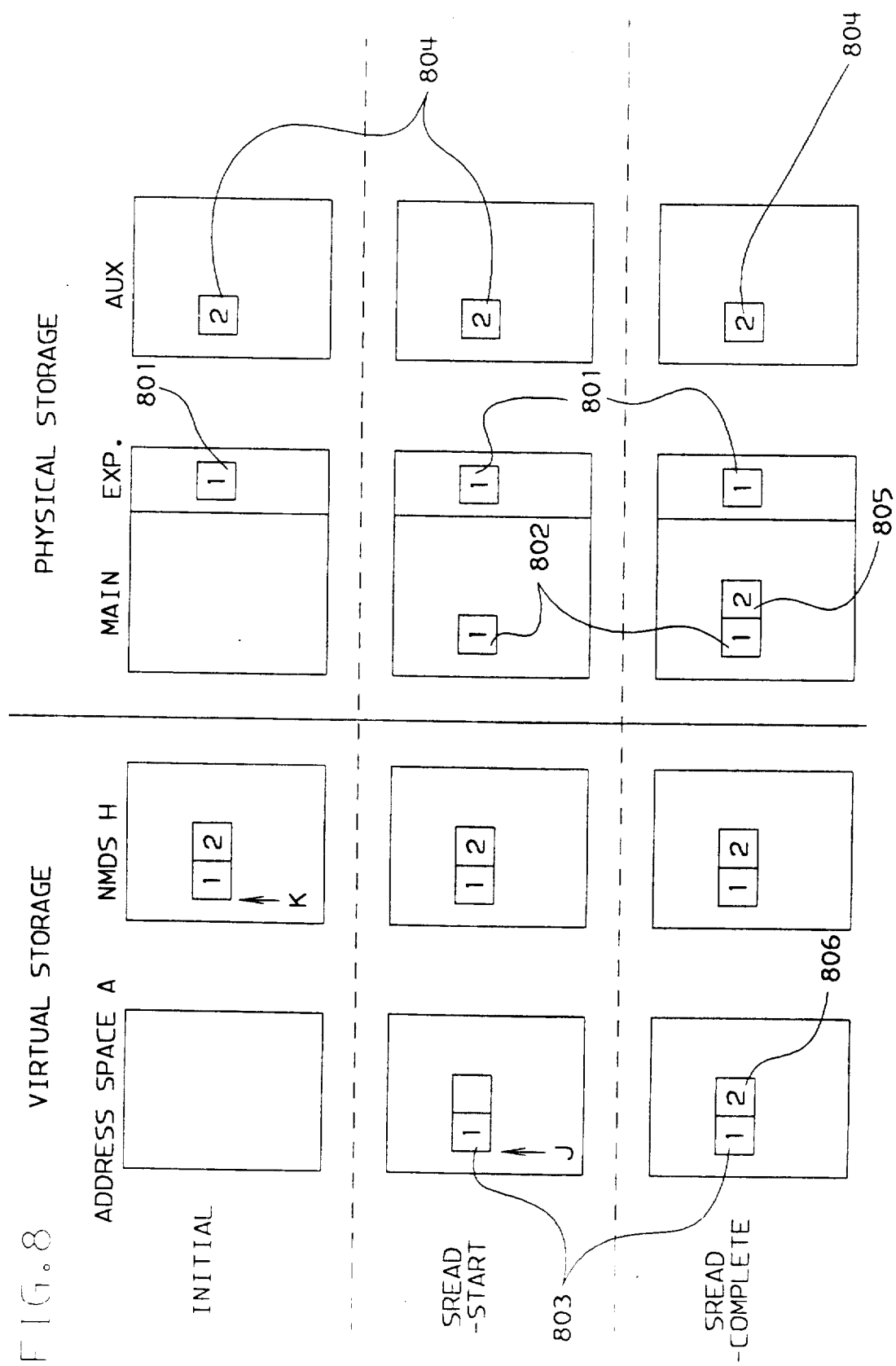

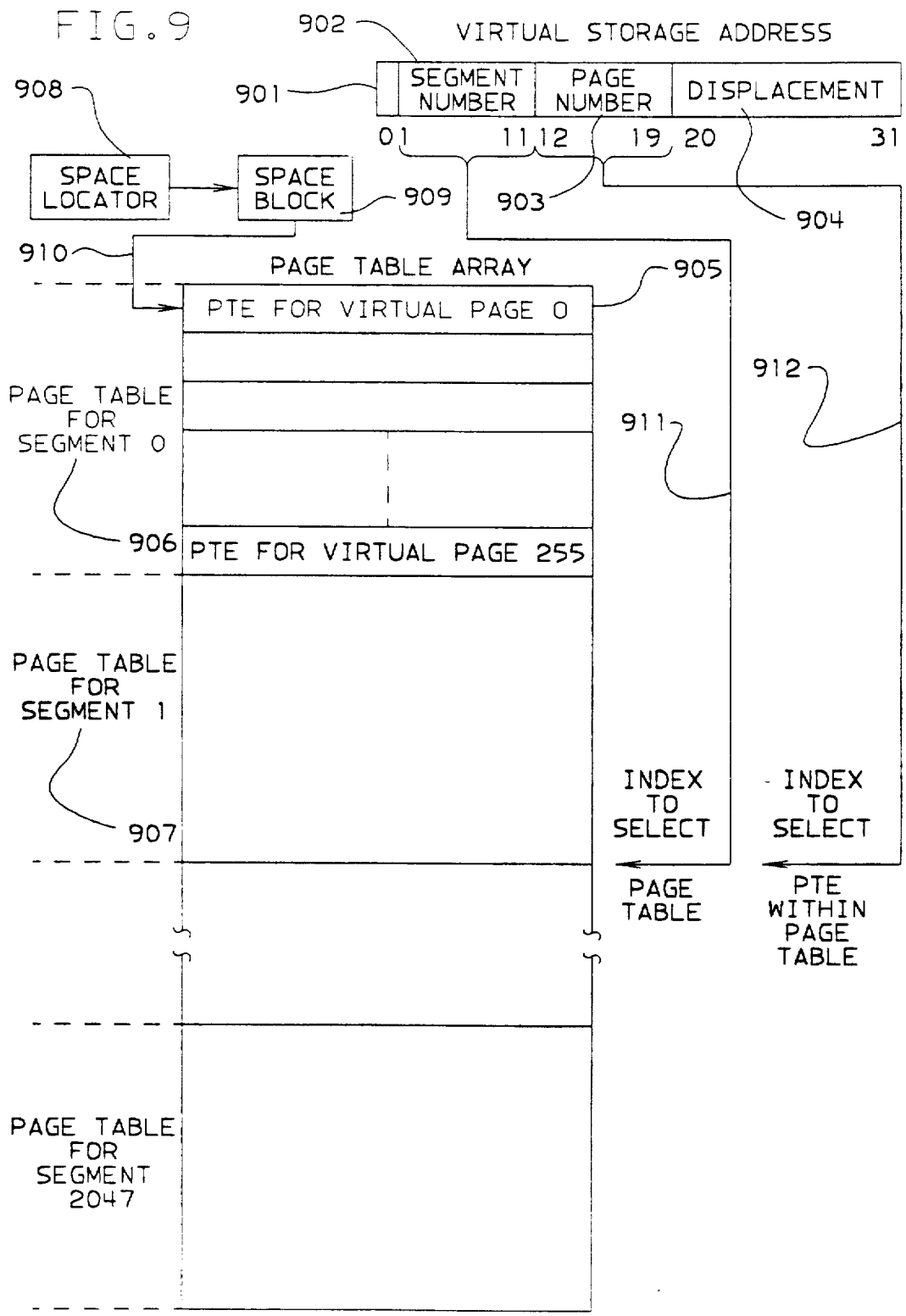

METHOD AND SYSTEM FOR STORING DATA IN AND RETRIEVING DATA FROM A NON-MAIN STORAGE VIRTUAL DATA SPACE

CROSS REFERENCE TO RELATED APPLICATIONS

This application contains subject matter which is related to the subject matter of the following applications filed on Feb. 10, 1988 and assigned to the same assignee: "Control Mechanism for Zero-Origin Data Spaces", by C. A. Scalzi, et al., U.S. Pat. No. 5,008,811, issued Apr. 16, 1991; "Linkage Mechanism for Program Isolation", by R. I. Baum, et al., (Ser. No. 154,733 abandoned, continuation filed Jul. 19, 1991, Ser. No. 732,936 ); "Home Space Facility" by C. E. Clark, U.S. Pat. No. 4,943,913, issued Jul. 24, 1990; "Access Register Translation Means for Address Generating Mechanism for Multiple Virtual Spaces", by R. I. Baum et al., U.S. Pat. No. 4,979,098, issued Dec. 18, 1990; "Nonhierarchical Program Authorization Mechanism", by R. I. Baum et al., U.S. Pat. No. 5,023,773, issued Jun. 11, 1991; "Domain Related Access Lists", by C. E. Clark, et al., U.S. Pat. No. 4,945,480 issued Jul. 31, 1990; and "Method and System for Mapping Data in a Virtual Storage Data Processing System", by C. Eilert et al., filed on even date herewith and also assigned to the same assignee. These co-pending applications are incorporated by reference herein.

FIELD OF THE INVENTION

This invention relates to the field of systems control programming. More specifically, it relates to the structure and capabilities of virtual data spaces, and methods for performing I/O to certain virtual data spaces.

DESCRIPTION OF THE PRIOR ART

In a virtual storage data processing operating system, such as IBM's MVS, MVS/XA and MVS/ESA, a virtual address space is a control structure that provides an addressing range within which a set of programs operate. See, e.g., MVS/Extended Architecture Overview, form GC28-1348; IBM Enterprise Systems Architecture/370 Principles of Operation, form SA22-7200. A virtual address space may contain both programs and data, while a special form of address range, called a data space, may contain only data. The aforementioned "Control Mechanism for Zero-Origin Data Spaces" (Ser. No. 154,688) details the differences between data spaces and address spaces. One common feature of all such prior art address ranges is that data within any such address space or data space, at a particular point in time, might reside in real (or main) storage, or in non-main storage (expanded storage, auxiliary storage, external storage, etc.). When, for example, a program executing in an address space referenced a virtual address within that same address space, two possibilities existed: if the virtual address represented data that was already in real storage, processing continued; if the virtual address represented data not in real storage, program execution was suspended, the data was brought into real storage, and program execution resumed.

The prior art also recognizes mechanisms for an application referencing and manipulating data residing in an address space other than that in which the application is running, or residing in a data space. Examples of such mechanisms include those of U.S. Pat. No. 4,355,355 entitled "Address Generating Mechanism for Multiple Virtual Spaces" to J. R. Butwell, et al., and 4,521,846, entitled "Mechanism for Accessing Multiple Virtual Address Spaces" to C. A. Scalzi, et al., both also assigned to the assignee of the present invention as well as the Cross-Memory function of MVS System Programming Library: System Macros and Facilities, Volume 1, form GC28-1150.

In some cases, it may be desirable to write data into a data space as a "temporary container" for that data, subsequently bringing the data back into the address space. The sequence of steps previously necessary to accomplish this includes reading the data to be written into main storage in the event that the address space page is backed by auxiliary storage; reading the target page into main storage in the event that the target data space virtual page is backed by auxiliary storage; moving the data within main storage from the address space backing page to the data space backing page. It should be clear that if the intent is simply to temporarily store the data in the data space, without referencing it there, the two I/O operations, and attendant CPU cache space replacement, is wasteful.

Finally according to the prior art, moving data from an address space to auxiliary storage might be either "synchronous"—meaning control is returned to the application only after the I/O completes, or "asynchronous"—meaning control is returned immediately, but the application is responsible for insuring that the I/O completes before, for example, re-using an output buffer.

SUMMARY OF THE INVENTION

In accordance with the present invention, a non-main storage data (NMDS) space is introduced which may be advantageously used as a temporary receptacle for data which will not be referenced directly while in the NMDS, but will be moved to a conventional address space or data space before being referenced. This NMDS is similar to address spaces and main storage data spaces, except that its virtual storage pages may never be backed by main storage.

Taking advantage of the characteristics of this NMDS, methods for performing I/O are presented which improve performance by allowing the switching of auxiliary storage backing pages between the NMDS and an address space, when possible, thereby avoiding physical I/O operations in many cases. Also, mechanisms are provided for performing I/O which, in certain cases, permit initiating programs to continue execution after initiating the I/O, then being able to immediately reference the input or output buffers—the system's paging mechanisms are used for necessary synchronization, without any awareness on the part of the initiator.

It is therefore an object of this invention to provide a novel type of addressing range (a NMDS), usable for temporary data storage with improved performance characteristics.

It is a further object of this invention to provide efficient methods of bringing data into and out of a NMDS.

It is a further object of this invention to allow MVS/ESA applications to reference and modify data in separate address/data spaces without the requirement of executing in "AR" (Access Register) mode.

It is still a further object of this invention to provide methods to permit, in appropriate cases, applications to initiate I/O operations to NMDS's and immediately be able to reference the input or output buffer area, without waiting for the I/O to complete, by using the system's normal page fault mechanisms for necessary synchronization.

BRIEF DESCRIPTION OF THE DRAWINGS

FIG. 1 is a block diagram illustrating the logical difference between a main storage data space, and two forms of Non-Main Storage Data Spaces (NMDS's) of the present invention: "Standard", and "ESTOR" (Expanded Storage) Only".

FIG. 2B is a block diagram illustrating the use of a System 370 instruction referencing operands in a separate (main storage) data space.

FIGS. 5A and 5B are a flow chart showing the steps involved in a request to read data from a NMDS of this invention to an address space.

FIG. 7 is a logical representation of the contents of virtual and physical storage during the writing of a page from an address space to a NMDS of this invention.

FIG. 8 a logical representation of the contents of virtual and physical storage during the reading of a page from a NMDS of this invention to an address space.

FIG. 9 is a block diagram illustrating the relationship between the virtual address of a page, and the virtual address of that page's page table entry.

DESCRIPTION OF THE PREFERRED EMBODIMENT

Figure 2A:
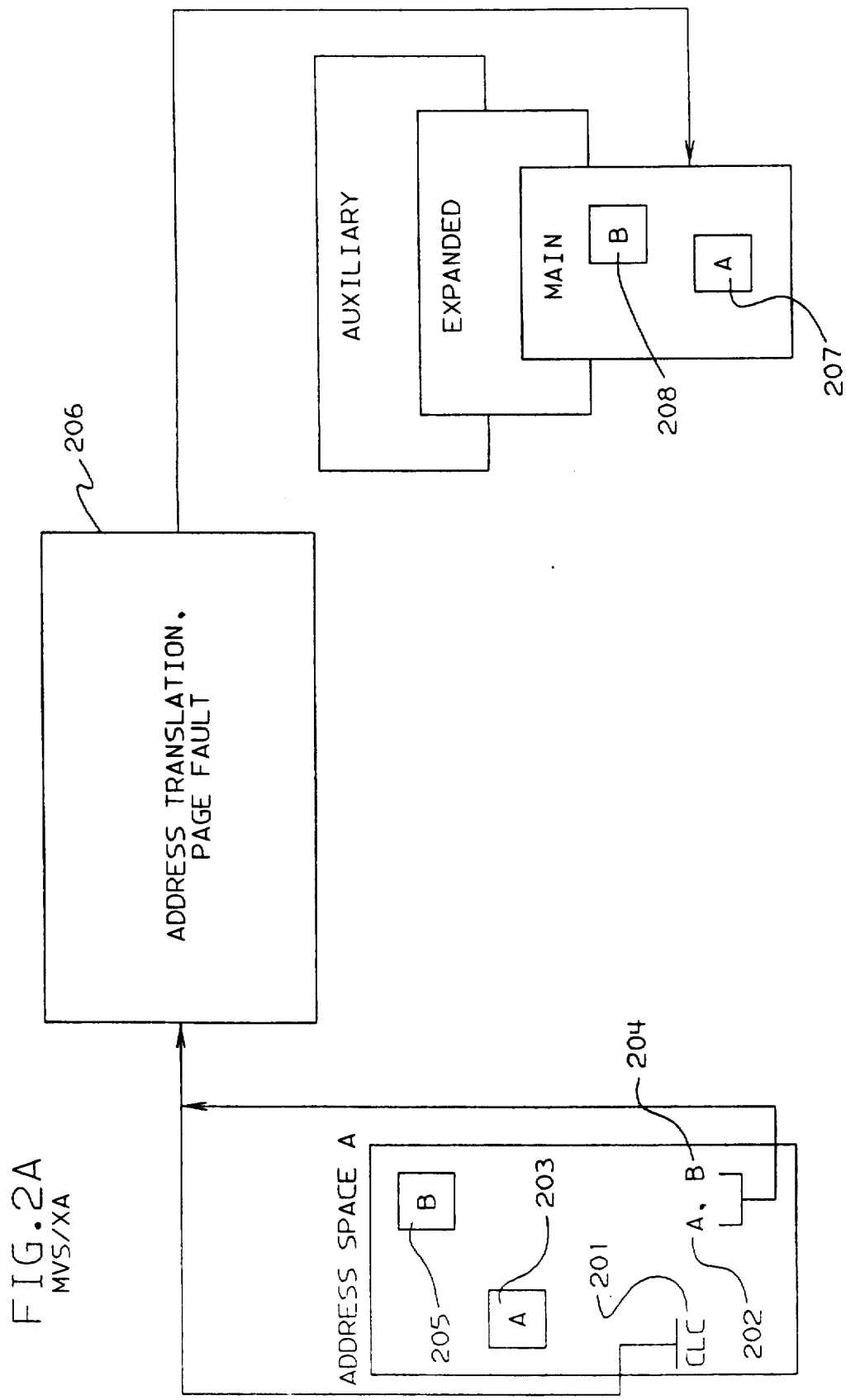
FIG. 2A is a block diagram illustrating the use of a System 370 instruction referencing operands in the address space of the instruction issuer.

FIG. 1 presents a logical view of two embodiments of the non-main storage data space of the present invention: A "standard" non-main storage data space (Standard NMDS) 10, and an expanded storage only non-main storage data space (ESTOR NMDS) 11. ("Expanded Storage" has also been termed "page storage"—and method of accessing it are described in U.S. Pat. No. 4,476,524 to D. T. Brown, et al., issued Oct. 9, 1984, and assigned to the assignee of the present invention.) In FIG. 1, Data Space 13 is shown as being backed by main storage 15 (as well as by expanded storage and auxiliary storage—DASD). Since it is backed by main storage, any storage referencing instruction may reference data space 13 from primary address space 12. For contrast, logical views of the two types of NMDS of the present invention (Standard 10, and ESTOR only 11) are also shown. The most significant difference lies in the fact that virtual pages in the two NMDS's 10, 11 may never be "backed" by main storage, while both an address space 12 and a data space 13 may have virtual pages backed by main (real) storage 14, 15. In an ESTOR NMDS 11, virtual pages can be backed only by expanded storage 16, while a Standard NMDS 10 can have virtual pages backed by either expanded storage 17, or auxiliary storage 18. Because of the special character of NMDS's, reference to them is not by "normal" storage referencing instructions, but rather by special instructions (e.g., SREAD/SWRITE(19) for a standard NMDS 10, or CREAD/CWRITE (19A) for an ESTOR only NMDS).

Figure 3:
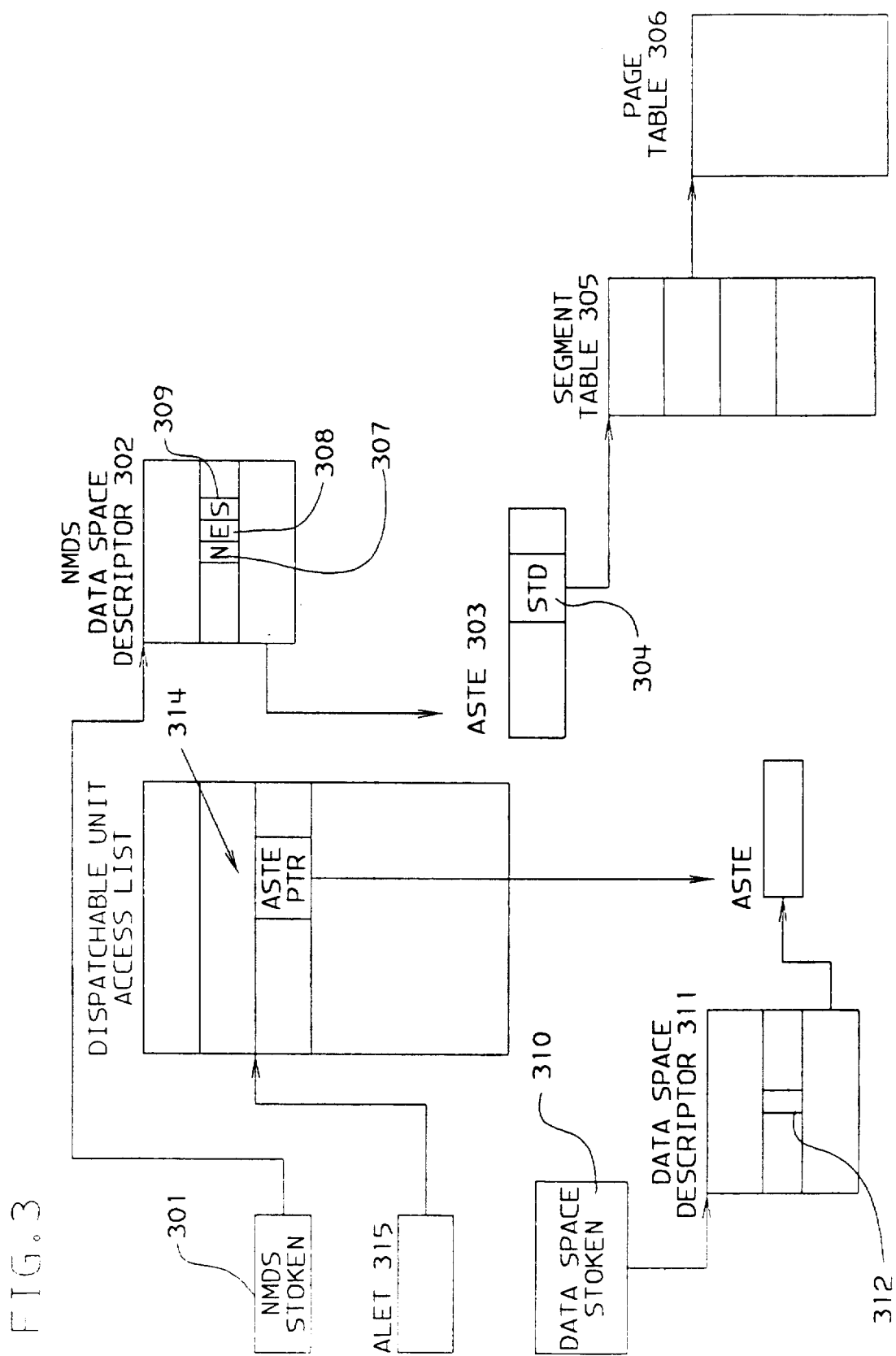
FIG. 3 is a logical diagram illustrating the relationship between an ASTE and an STOKEN.

A characteristic that flows naturally from the definition of a NMDS is that data residing in it may not be accessed by traditional (e.g., IBM System 370) storage referencing instructions which rely on the fact that the data represented by their operands is in real (main) storage. For example, FIG. 2A illustrates a "CLC" (compare logical character) instruction 201, in an MVS/XA system, comparing operand A 203 in the same virtual address space as the instruction at the virtual address indicated by 202, with operand B 205, also in the same virtual address space, at the virtual address indicated by 204. After conventional address translation and page fault processing (indicated at 206), the operands, still in virtual address space A, are physically located in main storage 207, 208, here they can be accessed for instruction execution. In order for a storage-referencing instruction to reference an operand residing in an address space or data space other than the address space containing the operand, the other address/data space must first be on an "access list" associated with the instruction—issuing application. The mechanism for using an access list in this manner is the subject of the aforementioned copending application "Domain Related Access Lists", by C. E. Clark, et al. (Ser. No. 154,685). An application requesting to have an address-/data space added to its access list must do so via a control program service. However, this control program service, before adding an address/data space to an application's access list, first checks to see whether the address/data space is a NMDS-type data space. The present invention makes use of the access list concept by associating with ASN (Address Space Number) second table entries (ASTE's) an indicator of whether a particular address/data space is a NMDS. If so, requests to add the NMDS to an access list by an application will be rejected by the system service. FIG. 3 illustrates this mechanism.

The creation of a data space/address space by an application results in the generation of an STOKEN (Space Token) 301 for subsequent references to the space. The STOKEN 301 logically points to the Data Space Descriptor 302, which is used to locate the ASTE 303, in turn containing the segment table descriptor 304 (locating the segment table 305, and Page Table 306). (Note that "Page table" may be read here to include the usual case where there are both Page tables and Extended Page tables. The distinction is not relevant to this invention.) If the creation was a NMDS, an indicator 307 in a data space descriptor flags the data space as a NMDS. Additional indicators flag it as an Expanded Storage Only (ESTOR) type NMDS 308, or a Standard (Expanded or Auxiliary Storage backing) type NMDS 309. For a main storage data space, such as that indicated by STOKEN 310, the NMDS indicator 312 in data space descriptor 311 is "OFF". Thus, when a request is made to add the data space associated with STOKEN 310 to the requestors access list 313, the system service detects 312 that the data space is not a NMDS, and so adds an access list entry 314 to the access list, and returns an ALET (Access List Entry Token) 315 which the application subsequently uses to access data in the data space. If, on the other hand, the application indicates that the NMDS associated with STOKEN 301 be added to an access list, the system service detects 307 that it is an NMDS-type data space, and rejects the request. Without an ALET, the application is unable to directly reference data in the NMDS.

In FIG. 2B, representing an MVS/ESA system, a similar CLC (Compare Logical) instruction 201 is shown, but the operands 203A and 205A reside in different address/data spaces from address space A. Through the Access Register—based address translation process 206A of MVS/ESA these operands are paged into main storage 207A, 208A which backs the virtual storage in the address/data spaces. Since by definition a NMDS virtual page is never backed by main storage, a mechanism must be provided for moving data between a NMDS and a conventional address space for reference by standard instructions. The mechanism described here includes the SREAD/SWRITE (Cache Read/Cache Write) services (FIG. 1 at 19) for standard NMDS's, and the CREAD/CWRITE services 19A for ESTOR NMDS's.

SWRITE/CWRITE

Figure 4A:
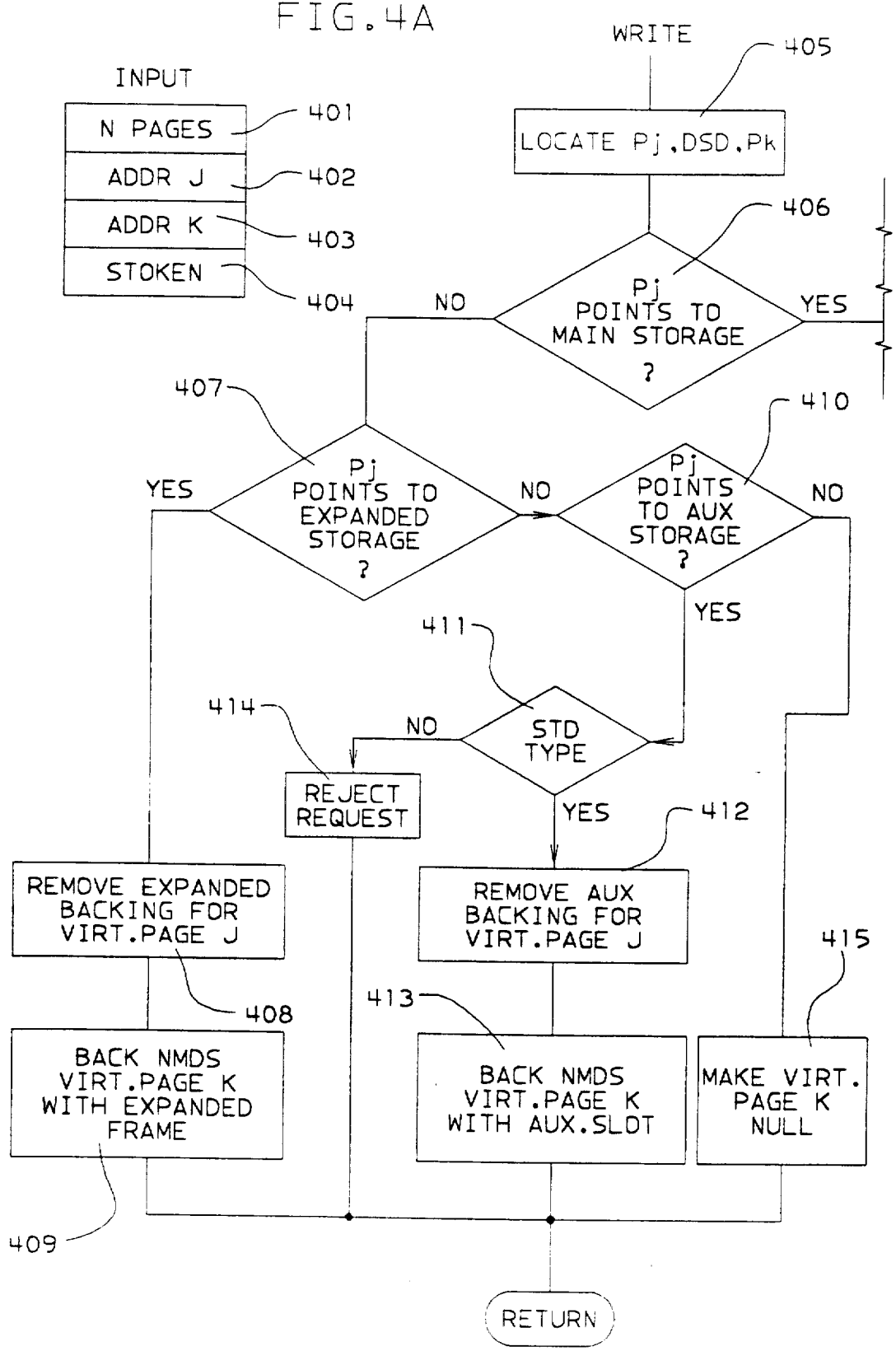
FIGS. 4A and 4B are a flow chart showing the steps involved in a request to write data from an address space to a NMDS of this invention.
Figure 4B:
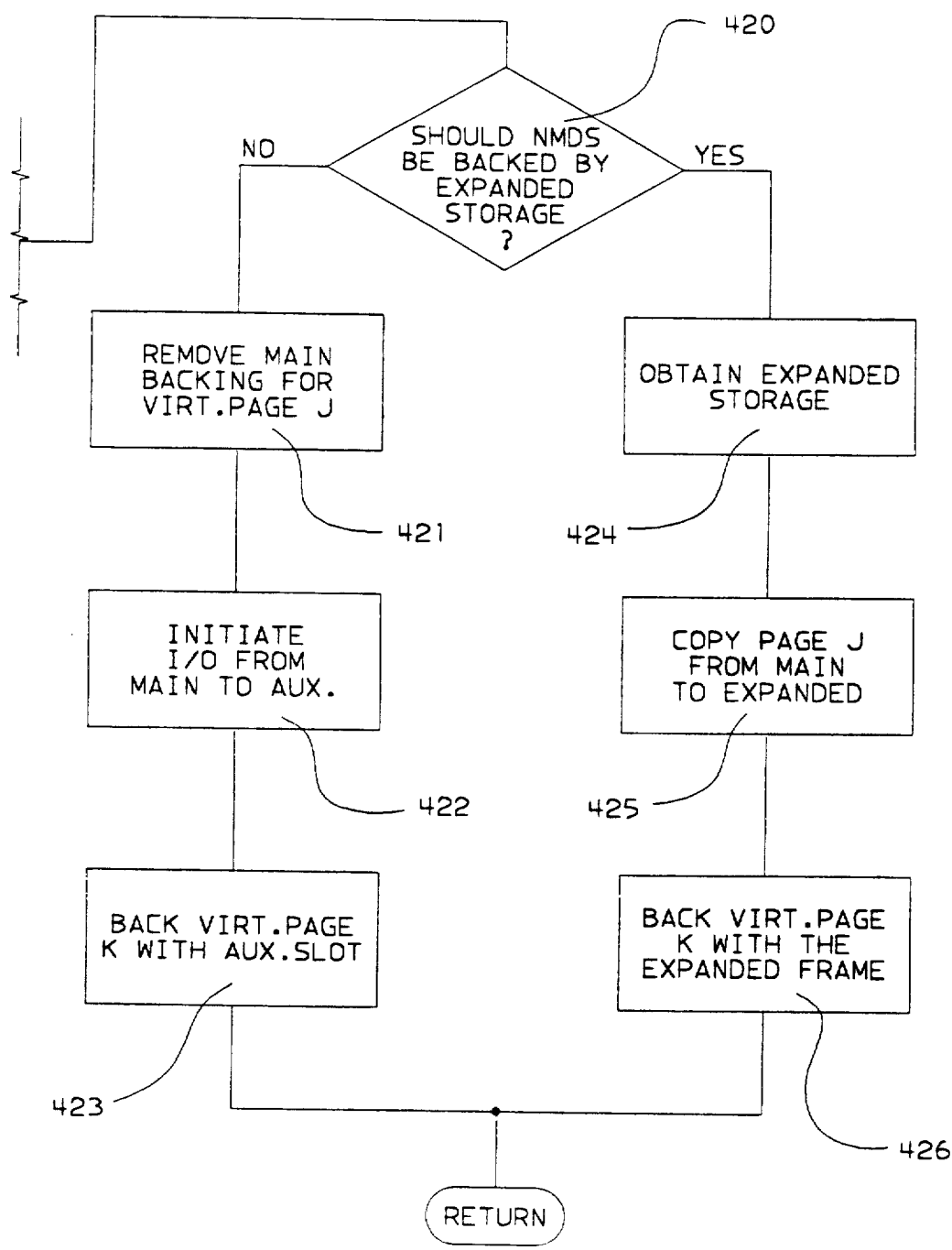

FIGS. 4A and 4B show the steps involved in a request by an application to write data from an address space to a NMDS. FIG. 7 illustrates a specific example of such a "write"—which will help explain the steps. In requesting the write, the application specifies: The number of contiguous pages to be written 401 (in the example of FIG. 7, this is 2); the virtual address of the starting page J in the application's address space 402 to be written; the virtual address of the starting page K in the NMDS being written to 403; and the STOKEN of the NMDS being written to 404.

First, 405, the page table entry (PTE) Pj associated with virtual page J in the address space is located via the virtual address of page J 402 (explained below); the data space descriptor (DSD) associated with the NMDS is located via STOKEN 404; and PTE Pk associated with page K in the NMDS is located via STOKEN 404 and the virtual address of page K 403, as indicated below.

Figure 6:
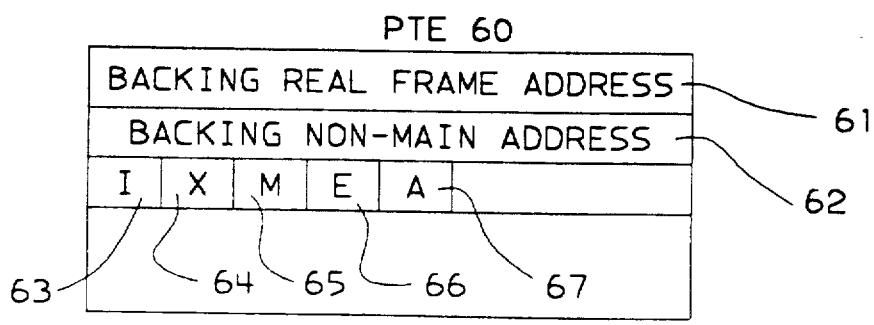
FIG. 6 the portions of a page table entry relevant to this invention.

Next, 406, a test is made whether the PTE for page J "points to" real (main) storage, indicating that page J is backed by a page in real storage. This is determined by examining the PTE (FIG. 6). "Invalid" indicator 63, if "OFF", shows that the associated page is backed by real storage (is "valid")—which real address is indicated in field 61. In the example of FIG. 7, the first page 701 is backed by main (real) storage 703; the second page 702 is not—it is backed by auxiliary storage 704.

If the page was not backed by main storage (the case with page 2 702), then 407 a test is made whether PTE Pj points to expanded storage (i.e., whether page J is backed by expanded storage). (Note that, in FIG. 7, neither page 1 701 nor page 2 702 is backed by expanded storage.) This determination is again made by examining the PTE (Page Table Entry) (FIG. 6): If the invalid indicator 63 is "ON", and the non-main storage indicator 64 and the expanded storage indicator 66 are "ON", then the page is backed by an expanded storage frame, whose address is in field 62. If there is expanded storage backing, the non-main storage indicator 64 and the indicator of expanded storage backing for page J 66 in the PTE are turned "OFF" 408 (indicating that the virtual page j is "null"—or "freshly acquired"; conventionally, a subsequent direct reference to such a page produces a page of zeroes) and virtual page K in the NMDS is backed 409 by this expanded storage (simply by turning ON the non-main storage indicator 64 and the expanded storage backing indicator 66 in the PTE for NMDS page Pk, and placing the address of this expanded storage page in field 62).

If Pj did not point to expanded storage 407, then a test 410 is made whether Pj points to auxiliary storage (i.e., flags 63, 64 and 67 are all ON): If not, then it is a "null" page that is being "written"—which can be accomplished simply by making the target NMDS page k also "null" 415 (by turning OFF the non-main storage backing indicator 64 in the associated PTE Pk); if the test 410 showed that Pj is backed by auxiliary storage, (as is the case for page 2 702 in FIG. 7). Then another test 411 is made to determine if the NMDS is a standard type, as indicated by the DSD indicator 309. If so, then the auxiliary storage backing 704 is removed 412 from the address space page 705, and associated 413 with the NMDS page 706 (by turning OFF the non-main storage indicator 64 and the auxiliary storage backing indicator 67 in the PTE associated with the address space page 705, and turning ON flags 64 and 67 in the PTE associated with the NMDS page 706, and placing the location of the auxiliary storage slot now backing the NMDS page in field 62 of the NMDS PTE). If test 411 indicates that the NMDS is an Expanded Storage Only type (indicator 308), then the request is rejected. (The application would then normally reference the address space page to bring it back into main storage and then repeat the request.)

If the test 406 showed that the address space virtual storage page is backed by main storage (as is the case with page J 701 in FIG. 7—its backing located at 703), then a test 420 is made whether the associated NMDS page 707 should be backed by expanded storage (or by auxiliary storage). This determination depends on (a) the type (standard or ESO) of the NMDS as indicated in the data space descriptor control block (FIG. 3 at 308, 309), and (b) the current system load on expanded storage. (For ESO-type NMDS's, always back with expanded storage; for standard NMDS's, an algorithm might be selected, for example, that backs with auxiliary storage if expanded storage is "heavily used", according to some local option. This is not critical to the present invention.)

If the NMDS page is to be backed by auxiliary storage (only possible for standard-type NMDS's; as is the case with page K 707 in FIG. 7), then 421 the backing for the address space page is removed 708 and the page is set "null" (by turning ON the "invalid" indicator 63 and the non-main storage backing indicator 64 OFF in address space page J's PTE) initiating 422 an I/O operation from main storage page J 703 to auxiliary storage (ultimately resulting in the writing of the page to location 709, FIG. 7); and backing 423 NMDS page K 707 with auxiliary page 709 (by turning ON the non-main storage indicator 64 and the auxiliary storage backing indicator 67 in the PTE associated with NMDS page K, and placing the location of the auxiliary page 709 in PTE field 62). Note that the address space virtual storage is immediately available for reuse, even if the I/O has not completed. This is the case because the address space virtual page has been marked as "null" (i.e., freshly acquired), meaning that a reference to it will result in a page of zeroes.

If the test 420 showed that the NMDS page should be backed by expanded storage, then 424 an expanded storage frame is obtained conventionally, page J is conventionally copied 425 from main to the newly obtained expanded storage frame, and 426 virtual page K is backed with this expanded storage page by placing the address of the expanded storage page into the appropriate field 62 of the PTE associated with NMDS page K, and turning on the non-main storage indicator 64 and the "expanded storage backing" indicator 66 in this PTE. The process described is repeated for each page in the write request.

SREAD/CREAD

Figure 5B:
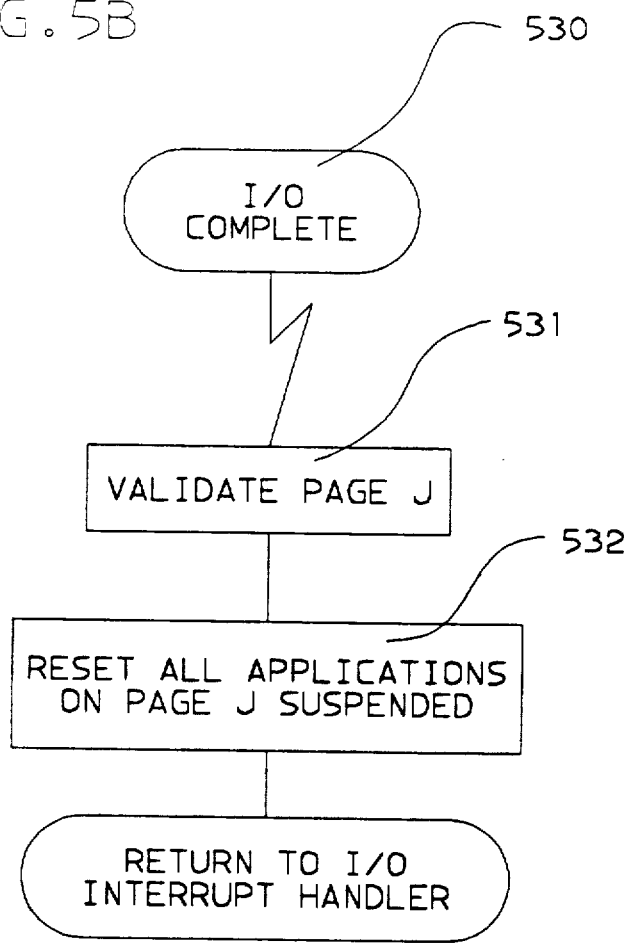

FIGS. 5A and 5B show the steps involved in a request by an application to read data from a NMDS to an address space. FIG. 8 illustrates a specific example of such a "read"—which will help explain the steps. In requesting the read, the application specifies: The number of contiguous pages to be read 501 (in the example of FIG. 8, this is 2); the virtual address of the starting page K in the NMDS to be read 502; the virtual address 503 of the starting page J in the address space A to receive the data; the STOKEN 504 of the NMDS being read from.

First, 506, the page table entry (PTE) Pk associated with virtual page K in the NMDS is located via the virtual address of page K 502 and STOKEN 504 as explained subsequently; and PTE Pj associated with page J in the address space is located via the virtual address of page J 503; the data space descriptor associated with the NMDS is located via the STOKEN 504.

Next, a test 507 is made whether the PTE Pk for NMDS page K points to expanded storage (i.e., whether backing page K is on expanded storage). If so (as is the case for page 1 801 in FIG. 8), a main storage frame 802 is obtained conventionally 508; the page is copied 509 from expanded storage 801 to main storage 802; virtual page J 803 is indicated 510 as "backed" by main storage (by placing the address of the real storage page in field 61 of PTE Pj); and by "validating" 511 the virtual page J (by turning OFF the "invalid" indicator 63 in PTE Pj for address space page J).

If Pk did not point to expanded storage 507, a test 515 is made whether page J is backed by auxiliary storage. If not, a further test 520 is made to verify that this is not an "ESO" type NMDS. (If it were, the request would be rejected, since this would indicate that the data in the ESO NMDS has been cast out of the space and is no longer available. (An ESO NMDS is treated like a cache and the data in it is not guaranteed to always be retrievable as is the case with a standard type.)). Being a standard NMDS, the address space page J is indicated as "freshly acquired"—or "null", by turning ON the "invalid" indicator 63 and turning OFF the non-main storage indicator 64 in PTE Pj. Processing is then complete—a subsequent reference to a virtual address in this page resulting conventionally in a page of zeroes.

If page K is backed by auxiliary storage (as is the case for page 2 804 in FIG. 8), then a real (main) storage frame is conventionally obtained 516; page J in the address space is "invalidated" 517 (by turning ON the "invalid" indicator 63 in the associated PTE Pj) (Any references to this page prior to re-validation will, conventionally, result in suspension of the referencer until the page is re-validated); virtual page J is indicated 518 as being "backed" by the obtained main storage frame (by placing the address of the frame in the address space page J's PTE field 61; and an I/O operation is initiated 519 to read the page backing NMDS page K 804 into the obtained main storage frame 805. (When this I/O is complete 530, address space page J 806 is indicated 531 as being "valid" (by turning OFF the "invalid" indicator 63 in the associated PTE), and all applications suspended on a reference to page J are conventionally made dispatchable 532). The process described is repeated for each page in the read request.

Mapping a Page Table Entry to a Virtual Page

For clarity, though not essentially part of the present invention, the following explains the relation between a virtual address and a page table entry:

A conventional 31 bit virtual storage address 901 has the capacity to address any byte in a range of 0 to 2 gigabytes—1 inclusive. For a virtual system based on 2048 segments of 1 megabyte each where each segment consists of 256 4 K byte pages, the virtual address can be partitioned into a segment number of 11 bits 902, a page number of 8 bits 903, and a displacement of 12 bits 904.

Each virtual page in the 2 gigabytes addressing space is represented by a page table entry (PTE). All PTEs for the 2 gigabytes space are each of the same length and are arranged contiguously in virtual storage in ascending order of the virtual storage they represent 905. Hence, the first 256 PTEs represent the pages in segment 0 and together form the page table for segment 0 906. The second set of 256 PTEs form the page table for segment 1 907, and so forth. Together all page tables form the page table array 905.

Now, to identify any virtual byte within a system consisting of multiple 2 gigabytes addressing spaces requires that a virtual storage address be accompanied by identification (space location) of the 2 gigabytes space to which the virtual storage address applies. This may be an address space ID (ASID) for a 2 gigabytes address space or a STOKEN for a 2 gigabytes data space. In either case, the space locator 908 leads to one or more control blocks, collectively called here a "space block" 909. The "space block" contains a pointer 910 to the array of page tables representing the 2 gigabytes addressing range of the space.

Now, given the address, consisting of a space locator and a virtual storage address, of any virtual page in the system, the PTE representing the page containing that byte can be located. The space locator 908 leads to the start of the page table array 905. The segment number 902 forms an index 911 to the page table within the array and the page number 903 forms an index 912 to the PTE within the page table.

Hence, knowing the address of a virtual page is equivalent to knowing the address of its page table entry and vice versa.

While the invention has been shown and described with reference to a particular embodiment, it should be appreciated by those persons skilled in the art that changes and modifications may be made without departing from the spirit of the invention or the scope of the appended claims.

What is claimed is:

1. In a central processing complex comprising a Central Processor (CP) having storage including main storage and non-main storage, system resources connected to the CP and the main storage, an operating system in the storage, controlling the system resources, and also controlling an application program, the improvement which comprises a non-main storage data space system comprising:
   a) a non-main storage data space (NMDS) having an associated NMDS indicator;
   b) prevention means, coupled to the NMDS indicator, for preventing said operating system from backing a page of virtual storage, within said NMDS, with said main storage;

c) means for writing data to the non-main storage data space on request of the application program;

d) means for reading data from the non-main storage data space on request of the application program.

2. The method of operating a computer to temporarily store data in virtual storage on behalf of a requestor, in an address space, for subsequent access, comprising transferring the data from the requestor's address space to a data space having only expanded storage or auxiliary storage backing pages in expanded storage or auxiliary storage, said transferring of the data comprising the step of switching any of the expanded or auxiliary storage backing pages, backing associated address space pages, to back previously unbacked pages of the non-main storage data space without an I/O operation.

3. The method of claim 2 in which said transferring of the data further comprises an operating system removing backing for any address space pages backed by main storage pages before initiating any output operations to copy said main storage pages to said auxiliary storage, so that any virtual storage previously backed by said main storage pages may be reused within the address space without waiting for the output operations to complete.

4. The method of claim 3 further comprising the step of backing said any address space pages with main storage backing pages set to an initializing value.

5. The method of claim 4 further comprising the step of preventing the requestor from directly referencing, via storage referencing instructions in the address space, the transferred data.

6. The method of operating a computer to enable a program to read data, temporarily stored in a data space, into an address space, comprising the following ordered steps:

a) said program issuing a read instruction to initiate the reading of said data into a virtual address space page;

b) invalidating said virtual address space page;

c) backing said virtual address space page with a main storage page frame;

d) said program referencing said data in said address space page without an explicit serialization by said program on said completion of said reading, e) completing said reading of said data into said main storage page frame;

f) validating said virtual address space page;

g) re-dispatching said program.

7. In a central processing complex comprising a Central Processor (CP) having storage including main storage and non-main storage, system resources connected to the CP and the main storage, an operating system in the storage, controlling the system resources, and also controlling an application program, the improvement comprising a non-main storage data space system comprising:

a) a non-main storage data space (NMDS) having an associated NMDS indicator;

b) prevention means, coupled to the NMDS indicator, for preventing said operating system from backing a page of virtual storage, within said NMDS, with said main storage, said prevention means comprising:

i) an access list for permitting access by an application in an address space to data in a data space, said list having entries associated with data spaces;

ii) inhibiting means for inhibiting an entry to the access list from being added for a data space when the associated NMDS is ON;

c) means for writing data to the NMDS on request of the application program;

d) means for reading data from the NMDS on request of the application program.

8. A NMDS support facility in a DP system, said DP system comprising a Central Processor (CP) having storage comprising main storage and non-main storage, system resources connected to the CP and the the main storage, and an operating system executing on and controlling said CP, and managing programs and data within one or more virtual address spaces, said NMDS support facility comprising:

a) a NMDS indicator within a control structure linked to as associated virtual address space, said NMDS indicator being ON if said associated virtual address space is a NMDS, and being OFF if said associated virtual address space is not a NMDS;

b) prevention means, responsive to said NMDS indicator, for preventing said operating system for backing a page of virtual storage, within said virtual address space, with said main storage, if said NMDS indicator is ON.

9. The NMDS support facility of claim 8 in which said non-main storage comprises expanded storage.

10. The NMDS support facility of claim 9 in which said non-main storage further comprises DASD storage.

* * * * *